Jan. 20, 1942.  M. E. BARKER  2,270,245

CHARCOAL ACTIVATING FURNACE

Filed April 23, 1940  2 Sheets-Sheet 1

INVENTOR
MAURICE E. BARKER
BY:
ATTORNEY

Jan. 20, 1942.　　　M. E. BARKER　　　2,270,245
CHARCOAL ACTIVATING FURNACE
Filed April 23, 1940　　　2 Sheets-Sheet 2
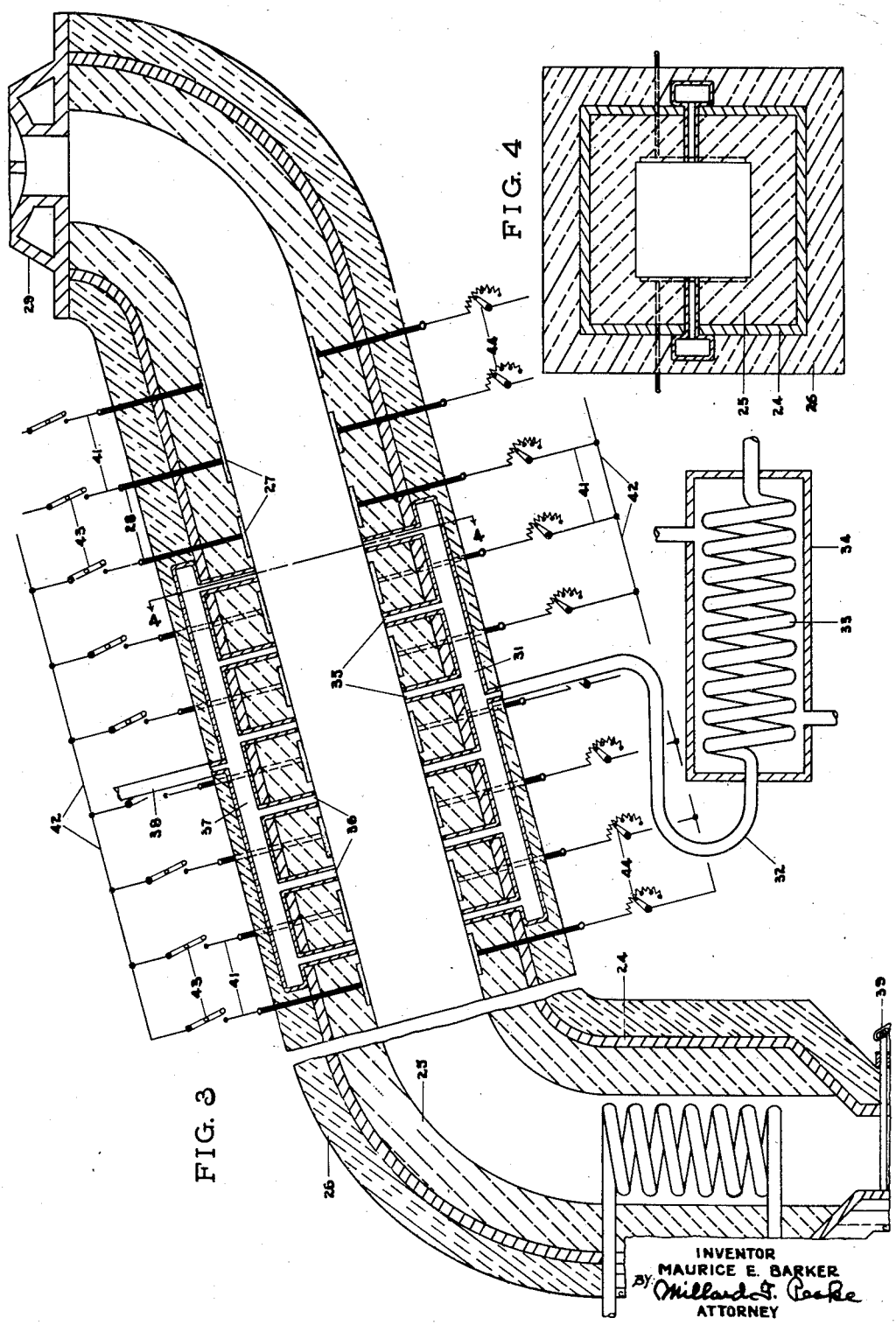

Patented Jan. 20, 1942

2,270,245

UNITED STATES PATENT OFFICE 2,270,245

CHARCOAL ACTIVATING FURNACE

Maurice E. Barker, Washington, D. C.

Application April 23, 1940, Serial No. 331,140

4 Claims. (Cl. 13—7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a furnace for the activation of granular carbonaceous particles. These particles, after activation, are employed commercially for air purification and solvent recovery as well as in purifying, decolorizing and filtering liquids. The present invention relates more particularly, however, to the production of activated carbon for air purification and solvent recovery purposes.

Activated charcoal of the type produced by the present invention is extensively used for the purification of air to be breathed and is, therefore, packed in gas mask canisters or other air purifying devices. The materials heretofore used for the production of activated charcoal are coconut shell, anthracite coal, bituminous coal, hard wood sawdust, wood flour or a mixture of the above, with the use of a binder in some cases. The present invention is adapted to the activation with any of the above materials or mixtures thereof after their preliminary carbonization, which can be carried out in any conventional type of equipment.

In the manufacture of activated carbon the first step is to carbonize the raw material and reduce this material to the form of granular particles in preparation for the final activation step which is carried out by heating the charcoal granules to a temperature in the vicinity of 1,000° C., in the presence of an activating gas such as carbon dioxide, steam or a mixture of these two gases to which a little oxygen may be added. Ordinary flue gas, slightly enriched with steam, is a gas suitable for such activating purposes. The reaction between the activating gases and the carbon granules is an endothermic one; that is, one which takes up or removes heat from the system. Consequently, it is necessary to continually supply heat to the granular bed of carbon during the period of activation. In addition, it is necessary to move the granules about with respect to one another in order that the activating effect may be uniform on the whole mass. In the past, heat has been generated by various means and transferred to the granular bed of carbon. In some cases an attempt has been made to generate heat within the granules themselves by means of the resistance of the granules to the passage of an electric current. Such a method, in general, is well known, being employed in the smelting of phosphorous rock when mixed with coke and in various other similar operations. The fact that an electric current in passing through a loose bed of carbon particles tends to generate considerable heat due to the resistance and loose packing, is well known in the art of metallurgy. My invention relates to a furnace by which this general method of generating heat within the carbon particles themselves is applied to the problem of charcoal activation, thereby greatly simplifying and cheapening the entire process and enabling exact temperature control within the various parts of the furnace.

One object of the present invention is to provide a furnace in which particles may be activated by a continuous process. Another object of the invention is to provide an electric furnace for activation of charcoal particles wherein the interior temperatures of the furnace may be readily controlled within relatively narrow limits. Another object is to provide an electric furnace for the activation of charcoal in which all of the charcoal is evenly and constantly heated to the desired temperatures without the material variations as heretofore were inveitable in prior furnaces. Another object of the invention is to provide an electric furnace for activation of carbon wherein steam or carbon dioxide, or a mixture of these two or of other activating gases may be mixed with the carbon undergoing treatment in the activating zone to facilitate activation.

These and various other objects of the invention will be apparent from the following description and appended claims, it being understood that the invention is not limited to the specific construction herein described by way of illustration.

Figure 3 is a central section of a modified form of angularly arranged furnace.

Figure 4 is a section on line 4—4 of Figure 3.

Figures 1, 2:
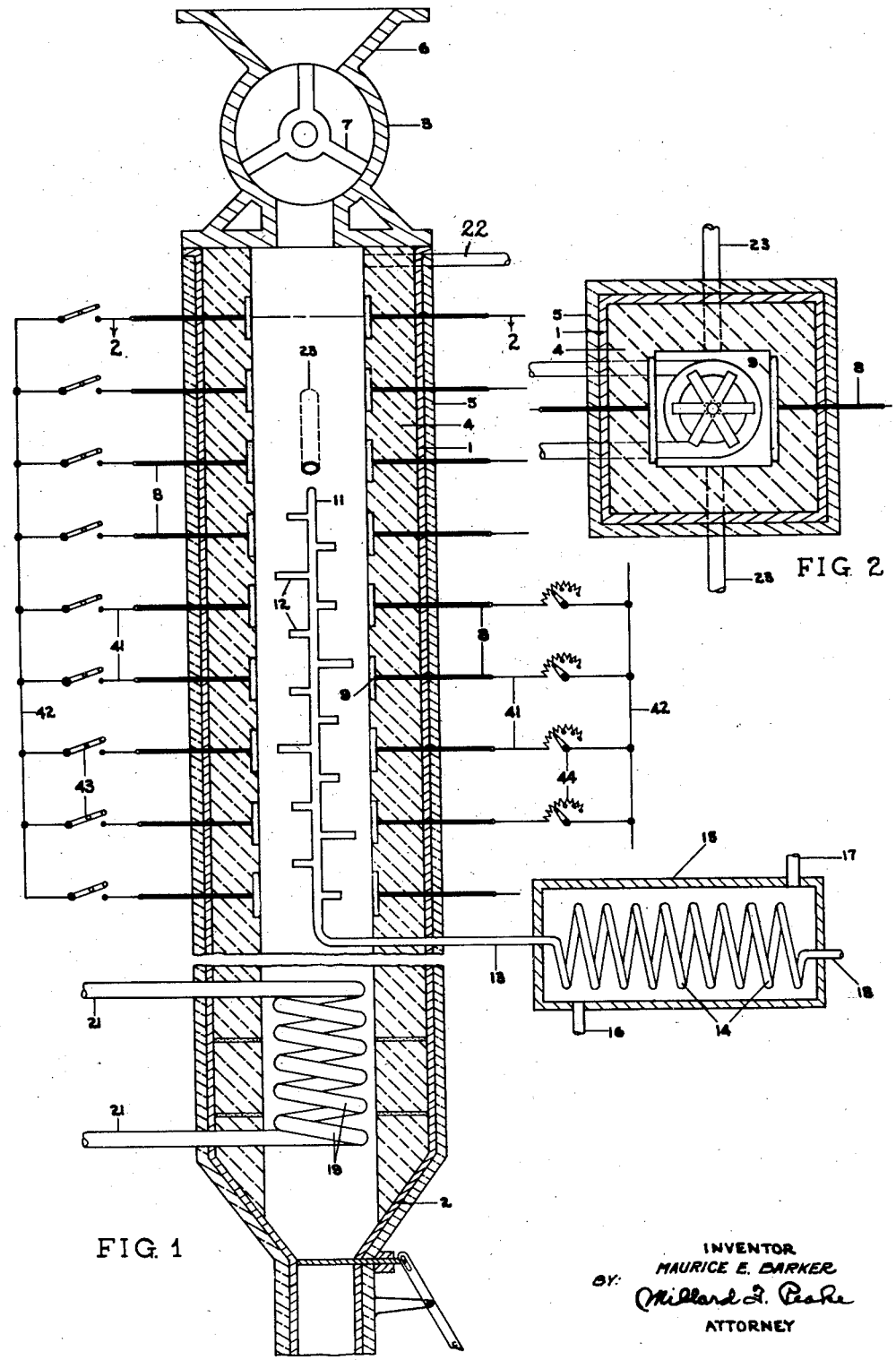
Figure 1 is a section of a vertical furnace.
Figure 2 is a section on line 2—2 of Figure 1.

Referring to Figure 1, there is provided a rectangular furnace, preferably formed of steel plates. This furnace is provided with a conical section 2 at its lower end, and has a flange at its upper end, to which a feeding device 3 for the incoming material is connected. The furnace is lined with refractory material such as fire brick or the like and is surrounded on its exterior with a heat insulating covering 5, such as magnesia or asbestos.

Feeding device 3 includes a conical hopper 6, and a bladed valve 7, whereby definite volumes of granular particles may be fed into the upper end of the furnace either intermittently or continuously. Projecting through the two opposite walls of the furnace are a plurality of electric conductors 8, which are connected at their inner ends to flat electrodes 9. The electrodes 9 are recessed into the inner face of the furnace as seen in Figure 1 in order to avoid ledges upon which the carbon may collect. The refractory lining is made smooth to facilitate passage of carbon or charcoal particles through the furnace and to reduce dusting of the particles while so passing through the furnace.

Extending upwardly through the central portion of the furnace is a pipe 11, having a plurality of outlet pipes 12, connected thereto. These pipes are arranged circumferentially about the central pipe 11, and have a plurality of small orifices therein in order to obtain an even distribution of the incoming gases. At its lower end pipe 11 is connected to an inlet pipe 13, which in turn is connected to a superheater coil 14, placed within superheater 15. Inlet and outlet pipes 16 and 17 on the superheater provide for incoming and outgoing gases, such as products of combustion. Pipe 18 connected to coil 14 leads to a source of steam or carbon dioxide, it being understood that in many cases a mixture of steam and carbon dioxide or other combinations of activating gases may be used.

Below the pipe 13, a cooling coil 19 is placed within the furnace 1 and is connected by pipes 21 for the inlet and exit of cooling fluid. It will be noted from Figure 1 that several electrodes 9 are placed above the upper end of pipe 11. Means are provided to remove the gases formed by the decomposition of charcoal in this zone. By this arrangement the incoming charcoal may be preheated to any desired temperature before it enters the activating zone adjacent to and surrounding the pipe 11. The portion of the furnace adjacent the cooling coil 19 constitutes a cooling zone. Such cooling is essential before the freshly activated carbon comes in contact with the air in order to prevent spontaneous combustion of the charcoal.

Adjacent its upper end a pipe 22 connects with the interior of the furnace for the escape of hydrocarbons and other gases evolved in the preheating zone. Two or more pipes 23, preferably arranged at an angle as shown in Figure 1, connect with the interior of the furnace just above the activating zone to provide for the escape of hydrogen, illuminants, and carbon monoxide produced by the reaction of the activating gases on the charcoal being treated. These pipes 23 may be connected to a source of vacuum, if desirable.

Operation of this form of the invention is as follows: By way of feeding device 3, the furnace is completely filled with granular particles to be activated, the valve for controlling exit of carbon (not shown) being closed. Electric current is then turned on into the conductors 8 and such current passes between the opposite facing electrodes 9. Due to the conductivity of the carbon particles and the shape and spacing of the electrode, this current passes through the furnace without arcing. However, an intense heat is generated due to the resistance of the carbon particles. For initial operation, the carbon within the cooling zone and activating zone is withdrawn from the lower end of the furnace after carbon in the preheating zone has reached the desired temperature. This withdrawn carbon is, of course, placed back into the hopper for activation.

The various electric conductors 8 are so connected with the source of electric power that current may be varied in the electrodes 9. Each electrode is connected by wires 41 to a power circuit 42, each connection having a cut out switch 43 and a rheostat 44, whereby the current through each set of electrodes may be varied. In this manner the carbon may be gradually brought up to the desired temperature in the preheating zone without formation of gas carbon or expansion of charcoal granules. The gases evolved during this preheating of the carbon escape through pipe 22. It is generally desirable to maintain the charcoal at temperatures between 850° and 1,000° C. in the activating zone. Therefore, the temperature in the preheating zone is gradually brought up to about 800° C. prior to entrance of the charcoal into the activating zone. The valves, not shown, controlling flow of carbon dioxide and steam are then opened and these gases are allowed to pass upwardly through pipe 11 and permeate through the charcoal by way of nozzles 12, it being understood that the steam and carbon dioxide are superheated in the superheater 15. The time required for activation of the charcoal depends principally upon the kind of raw material used, but in general varies from one to two hours. Due to the flexible arrangement herein provided, any degree of heat may be obtained within the preheating and activating zones and the temperature of the activating gases may be also controlled.

The charcoal passes to the cooling zone in order to materially reduce the temperature of the charcoal prior to its contact with air. It will be understood that the furnace is always completely full of charcoal, and the escape of the material from the furnace may be readily controlled by well known arrangements. It will generally be found preferable to have a continuous slow movement of the charcoal through the furnace. Due to the fact that the central pipe 11 and connected pipe 13 are insulated from the electric circuit there is no arcing of the electric current to pipe 11.

Referring to the modification shown in Figures 3 and 4, the furnace comprises the rectangular metal shell 24, refractory lining 25 and insulating covering 26. The electrodes 27 are connected by wires 28 to suitable sources of electric energy. The feeding device 29 is secured to the upper end of the furnace.

As in the form previously described, the furnace is normally full of charcoal undergoing activation, there being a preheating zone, an activating zone, and a cooling zone. In this form of the invention, the activating gases enter the furnace by way of a manifold placed on the lower side and escape through a similar manifold on the opposite side. The inlet manifold 31 is connected by pipe 32 to coil 33 in superheater 34. Manifold 31 has a plurality of pipes 35 leading into the furnace between each electrode 29 within the activating zone. Similar pipes 36 are connected to the escape manifold 37 on the upper side of the furnace which in turn is connected to exit pipe 38.

As in the prior form, electric conductors 28 are connected to a source of electric energy to provide for variations in current as desired. The operation of this form of the invention is quite similar to that shown in Figures 1 and 2, except that the activating gases pass diagonally through and permeate the carbon in the activating zone.

A control valve 39 is shown adjacent to the lower end of the furnace for taking off charges of charcoal after treatment.

In the form shown in Figures 3 and 4 the furnace is placed at an angle slightly steeper than the angle of repose of the charcoal particles. Therefore the granules move slowly downward with a slight rolling motion, whereby all sides are exposed to the action of the activating gases and are evenly heated by the electric current. If desired, however, the charcoal may be forced through the furnace by operating the inlet feed, whereby the particles are maintained in a compact mass with only slight rolling action. By this operation, the particles are maintained in close surface contact with one another and the amount of electric current consumed is reduced. As in the form shown in Figures 1 and 2, the electrodes have rheostats and cut-out switches for varying the current flow.

It will be understood that variations of this invention will be apparent to those skilled in the art without departing from the spirit of the invention nor exceeding the scope of the appended claims.

I claim:

1. An electric furnace for the activation of granular charcoal comprising an elongated chamber of rectangular cross section, a refractory lining within said chamber, a plurality of electrodes embedded in said lining with their inner faces flush therewith, said electrodes arranged in opposite walls of said chamber, said chamber being angularly positioned at an angle just greater than the angle of repose of the granular charcoal particles, whereby the particles roll with respect to one another to thereby secure even heating of all particles, means to feed charcoal particles into the upper portion of said chamber and means to withdraw said charcoal particles from the lower end of said chamber.

2. The invention as defined in claim 1 wherein means are provided to adjust the feed of charcoal into the furnace and its exit from the furnace whereby the surface pressure between charcoal particles may be varied by varying the feed and exit.

3. An electric furnace for the activation of granular charcoal comprising an elongated tubular chamber, a plurality of electrodes arranged in pairs on opposite sides of the chamber, means to feed granular charcoal through said chamber, the space between electrodes being bridged by charcoal particles, one group of electrodes constituting a preheating zone wherein the entering charcoal is gradually brought to substantially activating temperature, another group of electrodes constituting an activating zone wherein the charcoal is maintained at activating temperature, means to admit hot activating gas to said activating zone, and means to withdraw said activating gas and gases evolved by the charcoal directly from said activating zone, whereby said gases are prevented from entering said preheating zone and from contacting said charcoal in said preheating zone.

4. An electric furnace for the activation of granular charcoal comprising an elongated tubular chamber, groups of electrodes in the walls thereof, means to admit heated activating gas adjacent one group of electrodes, means within the chamber to cool the charcoal after activation, the parts being so arranged that the charcoal passes through a preheating zone, an activating zone and a cooling zone, and means to feed granular charcoal into and through said chamber at variable speeds and means to withdraw the charcoal out of the furnace at variable speeds, said latter means coacting with said former means to vary the surface pressure between the granular charcoal particles to thereby vary the temperature thereof.

MAURICE E. BARKER.